(12) United States Patent
Jenkin et al.

(10) Patent No.: US 9,030,591 B2
(45) Date of Patent: May 12, 2015

(54) DETERMINING AN IN-FOCUS POSITION OF A LENS

(71) Applicant: Apple Inc., Cupertino, CA (US)

(72) Inventors: Robin B. Jenkin, Morgan Hill, CA (US); Eugene Lam, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 238 days.

(21) Appl. No.: 13/708,361

(22) Filed: Dec. 7, 2012

(65) Prior Publication Data

US 2014/0022441 A1  Jan. 23, 2014

Related U.S. Application Data

(60) Provisional application No. 61/674,206, filed on Jul. 20, 2012.

(51) Int. Cl.
*G03B 13/00* (2006.01)
*H04N 5/232* (2006.01)

(52) U.S. Cl.
CPC ................................ *H04N 5/23212* (2013.01)

(58) Field of Classification Search
CPC ............................ H04N 5/23212; G02B 7/36
USPC ............ 348/345, 349; 396/89, 103; 356/4.04, 356/4.05; 382/255
See application file for complete search history.

(56) References Cited

U.S. PATENT DOCUMENTS

| 8,159,600 | B2 | 4/2012 | Tay |
| 8,194,995 | B2 | 6/2012 | Wong et al. |
| 2005/0212952 | A1* | 9/2005 | Triteyaprasert et al. ...... 348/345 |
| 2011/0199532 | A1 | 8/2011 | Jin |
| 2012/0086847 | A1* | 4/2012 | Foster ...................... 348/333.03 |
| 2012/0300091 | A1* | 11/2012 | Shroff et al. ............... 348/222.1 |

* cited by examiner

*Primary Examiner* — Paul Berardesca
(74) *Attorney, Agent, or Firm* — Blakely, Sokoloff, Taylor & Zafman LLP (57) ABSTRACT

An in-focus lens position may be determined by computing a focus metric value, by counting the number of transition pixels for images of a target captured at different lens positions. Using as little as two frames to compute two focus metric values, a reasonable approximation of the in-focus lens position may be obtained. The approximation of the in-focus lens position may then be used as a starting point for a fine focus search process, to determine an in-focus lens position. An advantage here is that the focus metric values relate to the number of transition pixels and are easy to compute, and yield a reasonable approximation of the in-focus position with just a few frames. Other embodiments are also described.

28 Claims, 6 Drawing Sheets

DETERMINING AN IN-FOCUS POSITION OF A LENS

RELATED MATTERS

This application claims the benefit of the earlier filing date of provisional application No. 61/674,206, filed Jul. 20, 2012, entitled "Determining an In-Focus Position of a Lens".

An embodiment of the invention relates to determining an in-focus lens position through the measurement of image quality at different lens positions, using a digital imaging system that contains the lens, in a camera component manufacturing setting. Other embodiments are also described.

BACKGROUND

Digital imaging systems or digital cameras have quickly become a popular consumer electronic device and have become a standard feature of portable multi-function devices including for example, portable multimedia players, laptop computers, smart phones, and tablet computers. The image quality expected from these devices has grown as higher quality and higher megapixel cameras have been incorporated into them. The image quality of an imaging system can vary depending on many factors, including the lens focus position along the optical axis of the imager. In general, a well-focused camera produces a sharp image and a poorly focused camera produces a blurry image. Thus, it is important to be able to place a camera lens at a well-focused or in-focus lens position. For fixed focal length imaging systems, the in-focus lens position is found and then fixed at the time of manufacture or assembly. As such, for high volume mass production of such cameras, there is a need to find the in-focus lens position quickly and efficiently because this can increase the number of units per hour that may be produced, yielding a production capacity advantage.

Finding an in-focus lens position usually involves measuring and comparing the image quality (e.g., sharpness) of images of a test target captured at several different lens positions. It is common practice to calculate Spatial Frequency Response (SFR) or Modulation Transfer Function (MTF) to measure the sharpness of a given image and thereby determine an in-focus position of a lens during camera module production. The computation costs for these measurements are expensive, and it is difficult to determine an in-focus position using SFR or MTF as an image quality metric from a small number of captured frames. This makes SFR and MTF based techniques impractical for fast lens focus setting of mass produced imaging systems.

SUMMARY

It has been determined that a system or process is needed that finds an in-focus position for a lens quickly and conveniently, in order to achieve a lower cost for very high volume manufacturing of digital cameras and camera modules, for example those used in consumer electronic devices such as smart phones, tablet computers, desktop computers, and in-room and in-vehicle entertainment systems.

In accordance with an embodiment of the invention, an in-focus lens position is determined by counting the number of transition pixels for images of a target captured at different lens positions. Using as little as two frames, a reasonable approximation of the in-focus lens position may be obtained. The approximation of the in-focus lens position may then be used as a starting point for a fine focus search process, to determine an in-focus lens position. An advantage here is that the focus metric relates to the number of transition pixels and is easy to compute, and yields a reasonable approximation of the in-focus position within just a few frames.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

The in-focus position of a lens may be determined using a process or system that measures the image quality (e.g., sharpness) of images captured by an imaging system at different positions of the lens. A lens position that produces sharp image quality is referred to here as an in-focus position, while other lens positions yield a blurry image. Finding the in-focus position of a lens usually involves capturing images at different lens positions and adjusting the lens position in the direction that improves image quality until the lens position that yields a desirably high image quality or sharpness is found. Image quality can be measured using an image quality metric. It is common practice to calculate Spatial Frequency Response (SFR) or Modulation Transfer Function (MTF) as an image quality metric to evaluate the image quality of an image and thereby determine the in-focus position of a lens. A disadvantage of using SFR or MTF to find the in-focus position of a lens is that there are multiple local maxima and minima in a SFR vs. lens barrel position graph, which makes it difficult to definitively determine the correct direction to move the lens to achieve good focus. Another disadvantage is that the strongly non-linear behavior of an SFR curve makes it difficult to predict in-focus position from a small number of measurements (each at a different lens position). Furthermore, using SFR or MTF as an image quality metric is slow because they are complicated algorithms to compute. This document discloses embodiments of systems and processes to quickly determine the in-focus position of a lens using a small number of measurements.

Target

Figure 1:
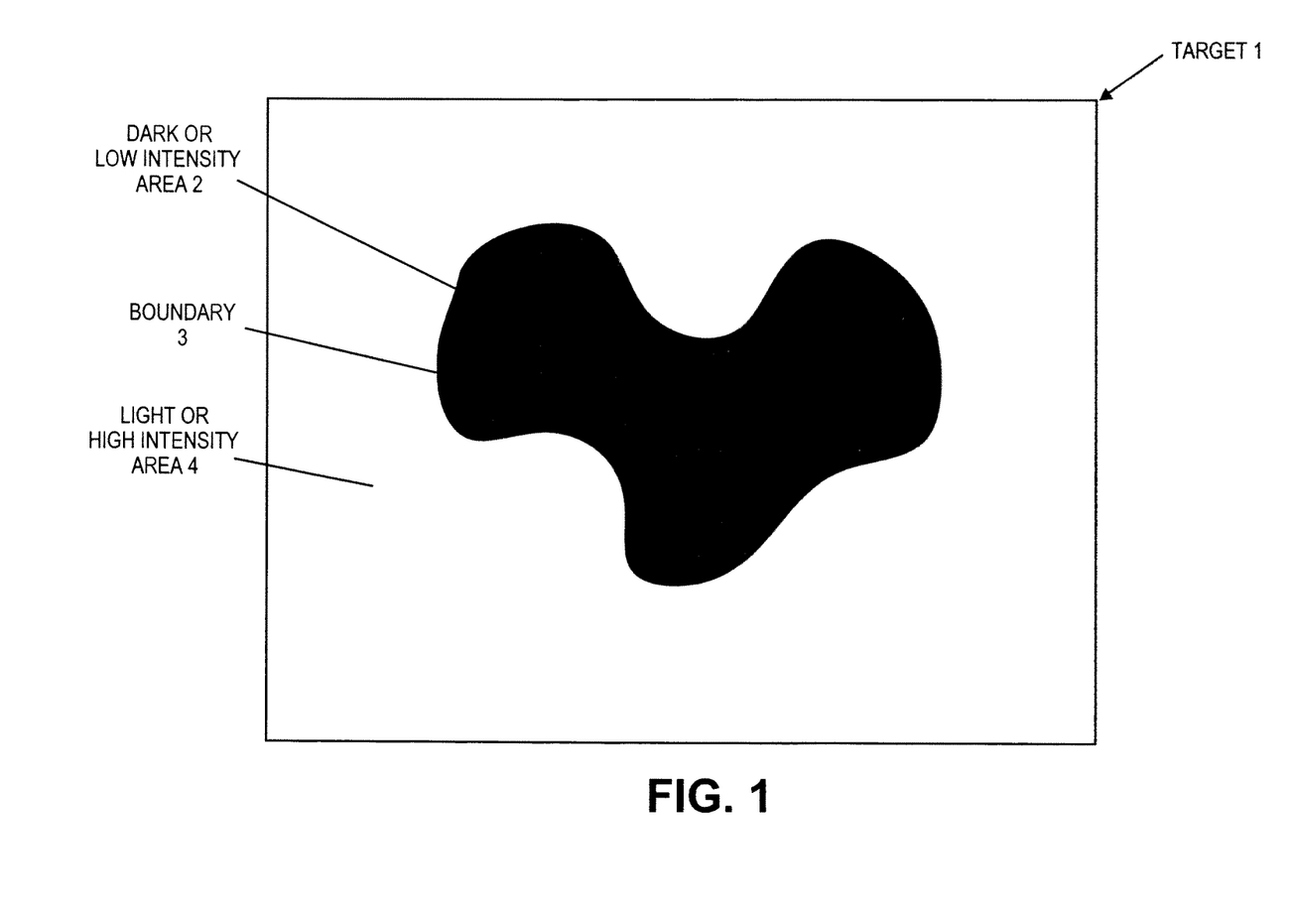
FIG. 1 is a representation of an example target that may be used to determine an in-focus position of a lens.
Figure 2:
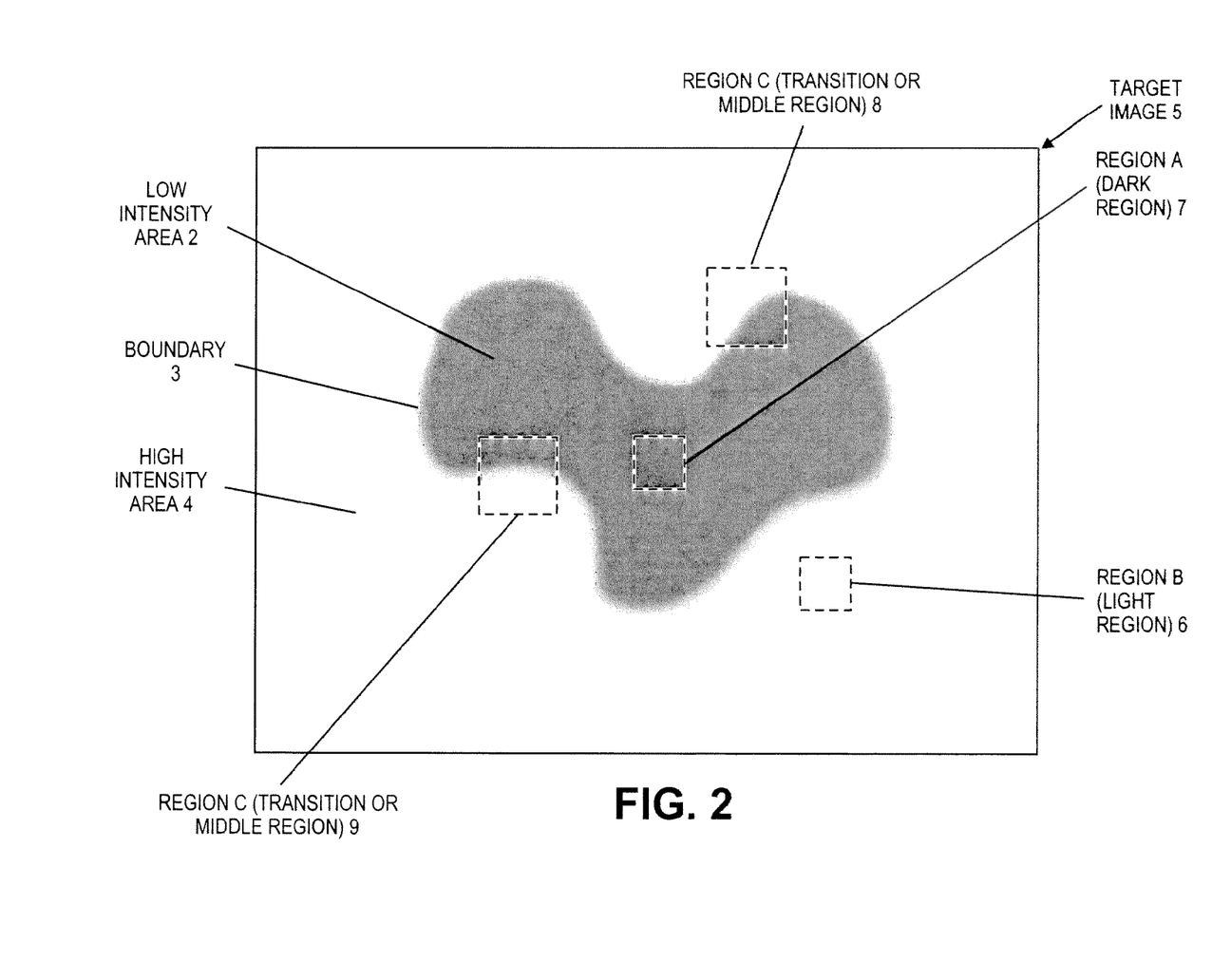
FIG. 2 is a representation of a digital image of the target depicted in FIG. 1, captured using the lens.

FIG. 1 is a representation of an example target 1 that may be used to determine an in-focus position of a lens in accordance with embodiments of the invention. The target contains a low intensity or dark area 2 and a high intensity (light or bright) area 4. The dark or low intensity area 2 yields on average a low intensity value relative to the light/bright or high intensity area 4. The low intensity area 2 in FIG. 1, for example, is an area filled with a dark grey value, while the high intensity area 4 is an area filled with a white value. The low intensity area 2 and the high intensity area 4 are adjacent to one another so as to form a boundary 3. A digital image of the target 1 (referred to as "target image") may be captured using an imaging system. FIG. 2 shows an example of a digital image of the target 1 shown in FIG. 1, captured with a poorly focused or out of focus lens, as indicated by a blurry boundary 3.

A dark region 7 may be chosen from the target image 5, such that the region 7 is completely filled by the low intensity area 2 of the target 1 and the average intensity value of the region remains essentially unchanged across the full range of focus or lens positions. This region may be referred to as "dark region" or simply as "region A", and is located away from the blurry boundary 3. Likewise, a light region 6 may be chosen from the target image 5 such that the region is completely filled by the high intensity area 4 of the target 1 and the average intensity value of the region remains essentially unchanged across the full range of focus, and is located away from the blurry boundary 3. This region may be referred to as "light region" or "region B".

A third region is defined, referred to here as a transitioning or middle region 9, which is chosen from a portion of the target image such that the middle region 9 encloses a portion of the boundary 3. This region may be referred to as "region C". Because region C contains pixels that are in the boundary 3, the intensity values within region C will vary with lens position. Each of the regions A, B, and C may be defined by pixel coordinates that refer to for example a full sensor resolution frame, and may have been predetermined when the images are being captured, by empirical laboratory testing using captures of the target by several sample Device Under Tests (e.g., camera lens modules having the same design specification).

Target configurations other than the one shown in FIG. 1 may be used to determine the in-focus lens position, using the processes described below. For example, low intensity area 2 and high intensity area 4 may contain other intensity values than shown in FIG. 1. In one embodiment, low intensity area 2 may be black and high intensity area 4 may be white. In another embodiment, low intensity area 2 and/or high intensity area 4 may be different color values.

The shape of the low intensity area 2 and the high intensity area 4 may take on many different forms (e.g., a slanted line pair). For example, in one embodiment, the low intensity area 2 may be a black square and high intensity area 4 may be a white background. In another embodiment, the target 1 may have a checkerboard configuration with the darker squares being low intensity area 2 and the lighter squares being high intensity area 4.

The boundary 3 between the low intensity area 2 and the high intensity area 4 need not be sharp or abrupt, as depicted in FIG. 1. In one embodiment, the intensity values while crossing the boundary 3 may change gradually. For example, the boundary 3 between a black low intensity area and a white high intensity area may transition gradually through various shades of grey. The relative color or lightness/darkness of the areas 2, 4, as well as the abruptness of the boundary 3, may impact the depth of the focus metric curve 46 depicted in FIG. 6 (to be described below).

With respect to the target image 5, region A (dark region) and region B (light region) may also take any suitable shape. In one embodiment, region A and region B are square shaped as depicted in FIG. 1. In another embodiment however, region A and region B may be circles. Other shapes and forms are contemplated as well.

Region C (middle region) 9 may be selected as any part of the digital image that contains at least one boundary 3 and that leads to a sufficient number of transition pixels being counted (discussed below). For example, in FIG. 1, the middle region 9 consists of two separate square-shaped areas that encompass different portions of the boundary. In another embodiment, the middle region 9 may be a single enclosed region that encompasses the entire target image 5. The middle region 9 may also be of any suitable shape (e.g., square, rectangle, circle) or form.

Process for Determining In-Focus Lens Position

Figure 3:
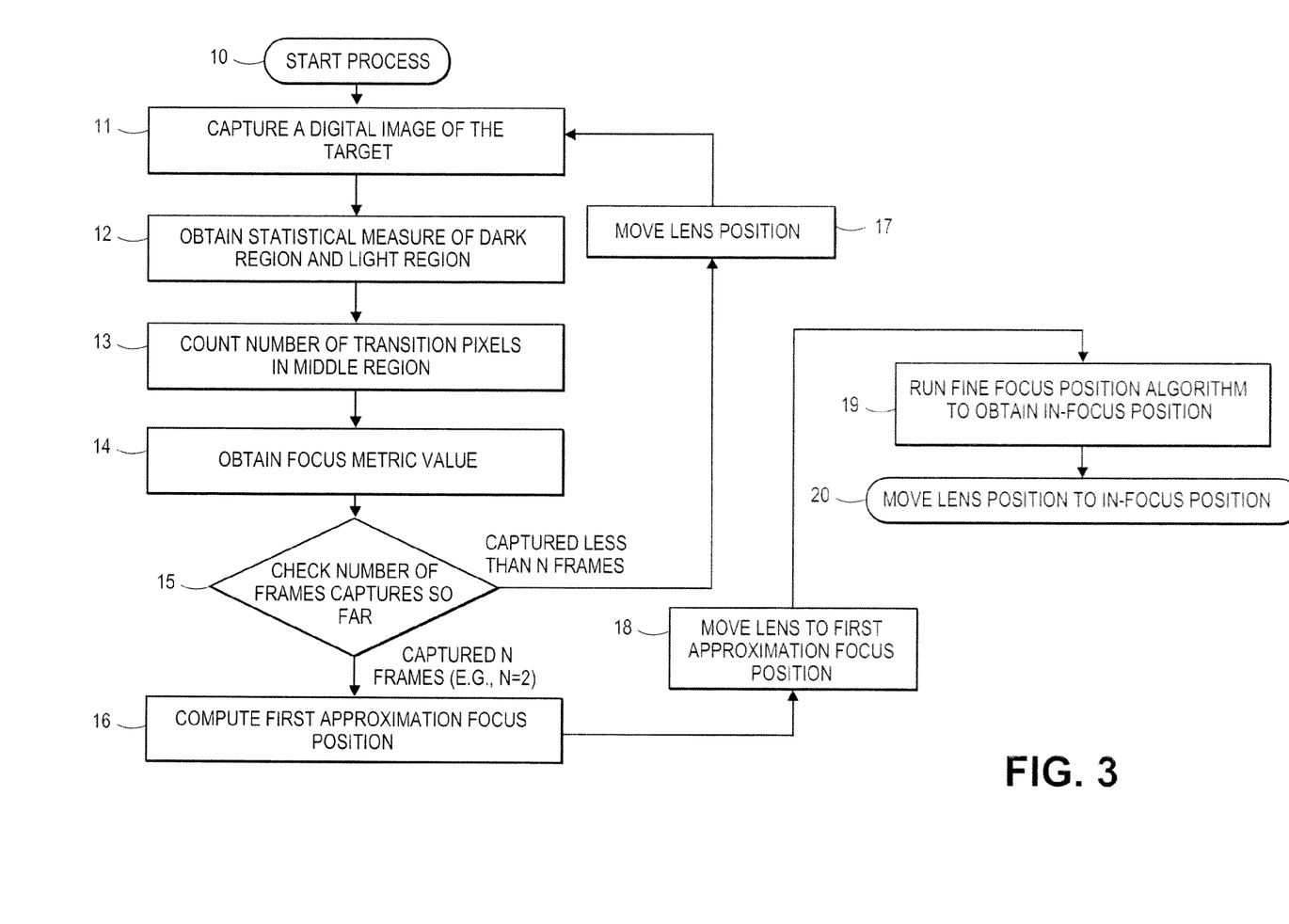
FIG. 3 is a flow chart of a process for determining an in-focus lens position.

FIG. 3 is an example of a flow diagram of a process for determining an in-focus lens position. The process starts at block 10. At block 11, a digital image of a target (e.g., the target 1) is captured using an imaging system. At block 12 a statistical measure of a dark region and the statistical measure of a light region are obtained. At block 13, the number of transition pixels in the middle region 9 is counted. Transition pixels may be defined as pixels having a value within a selected range. The selected range may be any range of pixel values in between the statistical measure of region A and the statistical measure of region B. The total number of transition pixels is then used in block 14, to obtain a focus metric value.

An embodiment of this invention can determine a reasonable approximation of the best focus position of a lens by capturing several frames. The reasonable approximation of the best focus position may be referred to as a "first approximate lens position". The first approximate lens position may be obtained by obtaining a focus metric value for target image 5 using the processes described above for N different lens positions. The example flow chart in FIG. 3 has a decision point at block 15 that checks the number of frames captured so far. If the number of frames captured is less than N, flow moves to block 17 where the lens position is moved and the processes of blocks 11-14 are repeated to obtain another focus metric value. In this fashion, a focus metric value may be obtained for each of N different frames. At that point, in block 16, the first approximate lens focus position is computed using the focus metric values and lens positions of the captured frames, and the lens is then moved to that position in block 18.

Once a first approximation lens focus position is found, a fine focus position search for an in-focus lens position may then proceed using the first approximation lens focus position as a starting point. At block 19 of the flowchart shown in FIG. 3, a fine focus position process or algorithm is run to find an in-focus position and the lens position is moved to an in-focus position at block 20. Different types of fine focus position processes or algorithms may be used. In one embodiment, a proposed focus metric approach described below can be used, with the formulas (50)-(52) being used to compute successive focus metric values until the local minimum or trough is found. In another embodiment, as shown in block 31 of the flowchart of FIG. 4 (described below), conventional SFR or MTF based techniques can be used to find the in-focus position of the lens by finding the local maximum of the SFR/MTF curve. Other techniques for obtaining the in-focus lens position, as part of the fine focus search process are contemplated as well.

Figure 4:
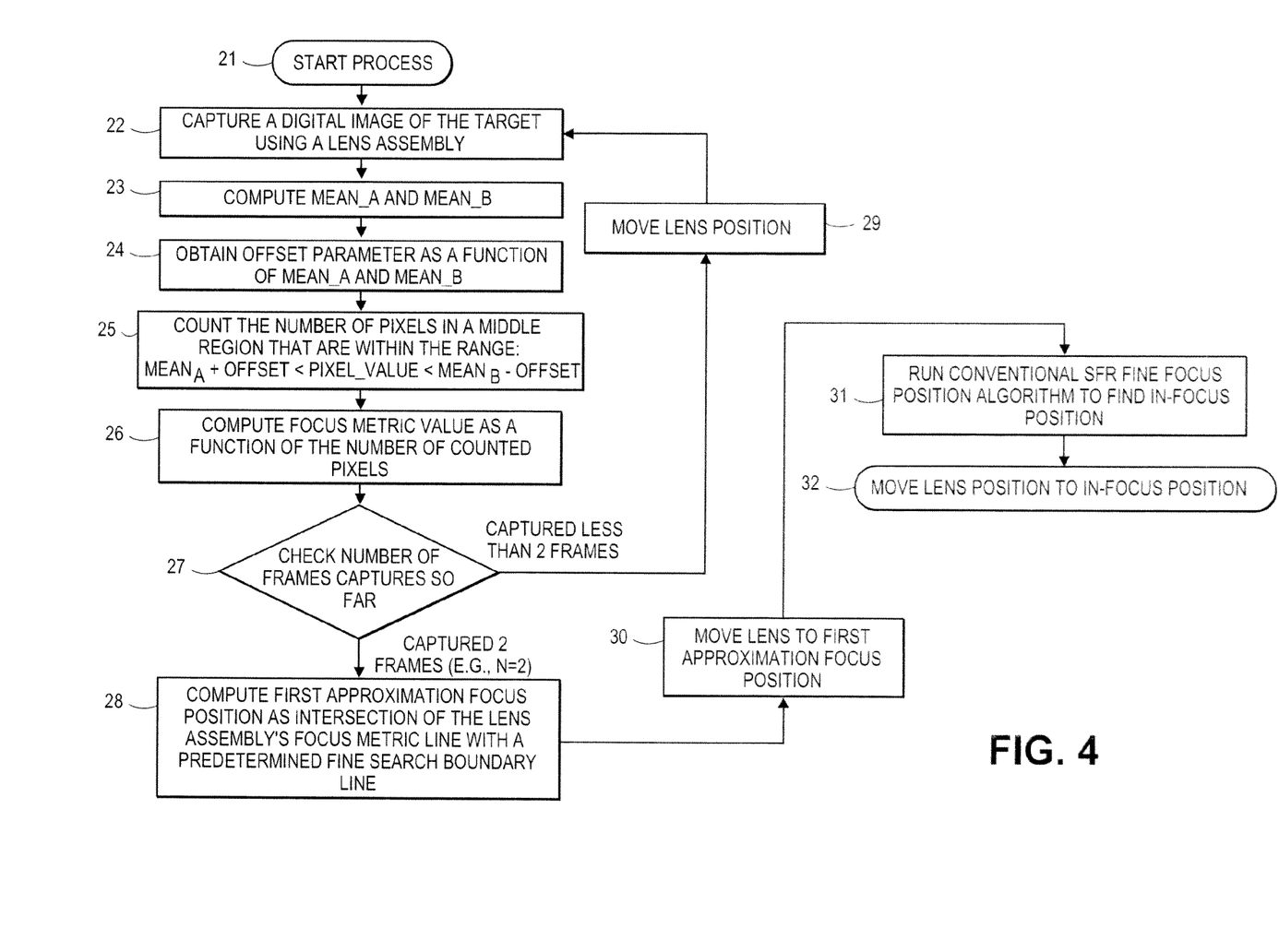
FIG. 4 is a flow chart showing another process for determining an in-focus lens position.

FIG. 4 is a more specific example of a flow diagram of a process for determining an in-focus lens position than the flow diagram shown in FIG. 3. The process starts at block 21. At block 22, a digital image of a target (e.g., the target 1) is captured using an imaging system. At block 23, the mean value of region A (dark region) and the mean value of region B (light region) of the target image 5 are calculated. Although this particular embodiment shown in FIG. 4 calculates a mean value, in other embodiments other statistical measures (e.g., median, mode) may be used. At block 24, an offset parameter is calculated as a function of the mean values of region A and region B. An offset parameter may be used to define the transition pixel range but is not necessary. An example equation 50 is given below, for obtaining an offset parameter by taking a fraction of the difference between the mean value of region A and the mean value of region B where n can be any suitable value larger than one. An example of a pixel value range 51 selected using the offset parameter is also given, where the range includes pixels having values larger than a) the sum of the mean of region A and the offset parameter but lower than b) the difference of the mean of region B and the offset parameter.

$$\text{offset} = \frac{mean_B - mean_A}{n} \quad (50)$$

$$mean_A + \text{offset} < \text{pixel\_value} < mean_B - \text{offset} \quad (51)$$

$$\text{focus\_metric\_value} = \frac{k * num_{transition\_pixels}}{total\_pixels_C} \quad (52)$$

Although the formulas above select a transition pixel range by applying the same offset parameter value from the mean of region A and the mean of region B, different offsets may be used.

At block 25, the number of transition pixels in the middle region 9 that are within the range, $mean_A+\text{offset}<\text{pixel\_value}<mean_B-\text{offset}$, is counted. At block 26, a focus metric value is computed as a function of the total number of transition pixels counted in block 25. As an example, equation 52 is given above, to obtain a focus metric value from the total number of transition pixels, where k is a constant and $total\_pixels_C$ is the number of pixels in the middle region 9. In this example equation 52, the total number of transition pixels is divided by $total\_pixels_C$ to normalize for the number of pixels in the middle region 9 and this value is multiplied by a constant k for convenience. Normalization of other factors that may affect the total number of transition pixels are contemplated as well.

The focus metric value can be thought of as a measure of sharpness of the digital image. A defocused image (see FIG. 2) will have fuzzier boundaries and thus contain a greater number of transition pixels, and consequently a larger focus metric value. On the other hand, a well-focused image will have sharper boundaries and thus contain a smaller number of transition pixels, which leads to a smaller focus metric value.

Figure 6:
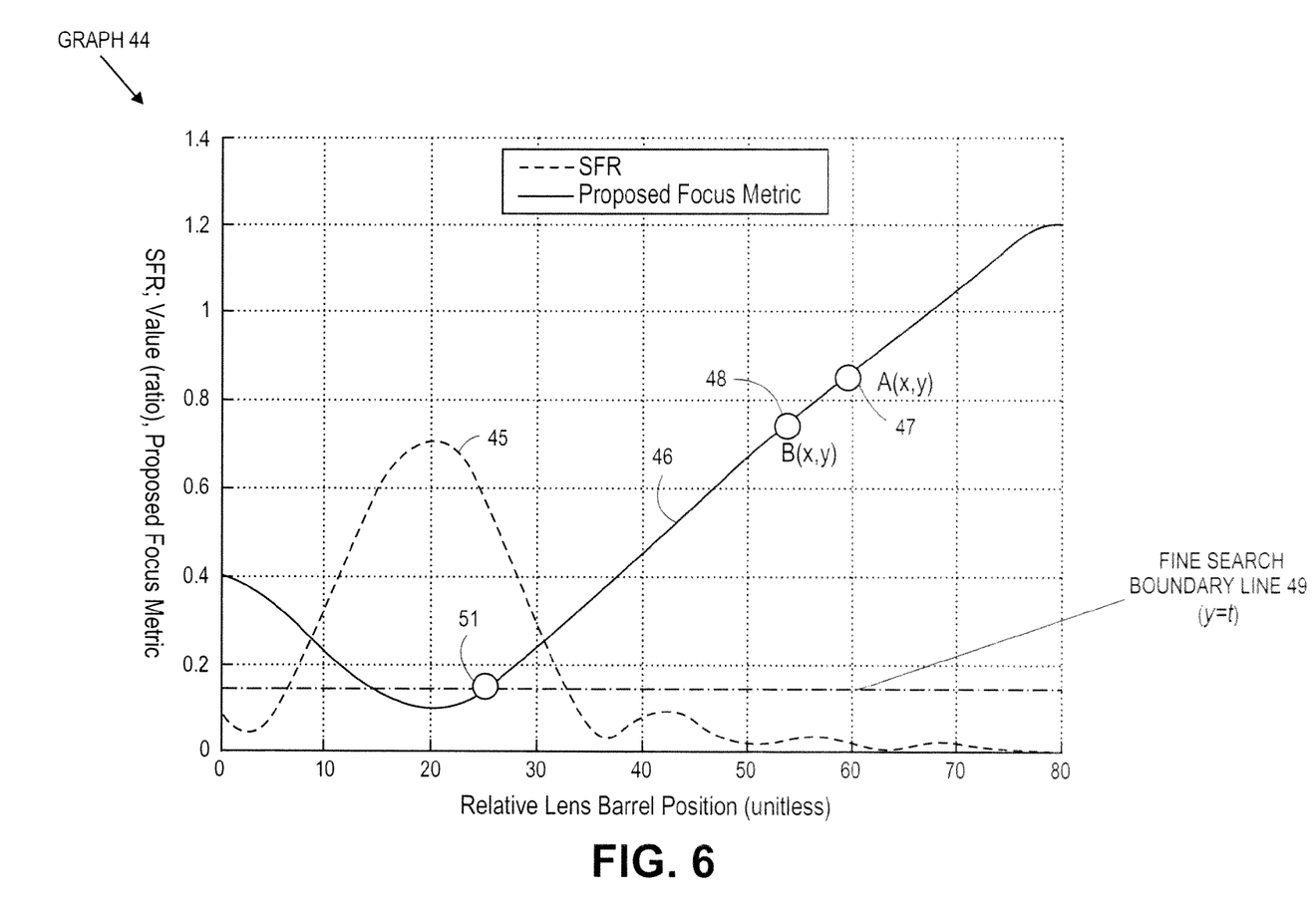
FIG. 6 is a graph plotting focus metric values and SFR values with respect to lens barrel position.

The desired focus position according to the proposed focus metric approach here may be the lens position at which the focus metric value is the smallest. FIG. 6 shows an example of a graph 44 with lens barrel position as the x-axis and the proposed focus metric value as the y-axis. An example of a focus metric curve 46 for a particular target, captured by an imaging system and computed in accordance with an embodiment of the invention, is plotted on the graph 44 as a function of lens barrel position. The desired lens focus position according to the proposed focus metric is the x-value of the lowest point on the focus metric curve 46 since this is the point at which the proposed focus metric value is minimized. The focus metric curve 46 may shift up or down and/or become shallower or deeper based on the configuration of the target. For example, a focus metric curve 46 for a target that has gradual, rather than abrupt boundaries may be shifted up and not as deep as a focus metric curve computed for the same target but with abrupt boundaries.

For comparison purposes, an example of a SFR curve 45 plotting lens barrel position on the x-axis and SFR values on the y-axis for the same target is shown in FIG. 6. In contrast to the proposed focus metric curve 46, higher SFR values indicate higher image quality and lower SFR values indicate lower image quality. Thus, for SFR curve 45, the point representing the "best" image quality (e.g., sharpness) is the point at the apex of the first hump in SFR curve 45 since this is the point at which the SFR value is maximized. As can be seen, the SFR curve 45 has multiple local maxima and minima, which makes it difficult to definitively determine the correct direction to move the lens to achieve best focus. For example, if an image of the target is initially captured using lens barrel position 40, there is no efficient way to know for sure whether the best lens focus position is larger than 40 or less than 40. As a result, several additional frames must be captured before being able to determine the correct direction to move the lens to achieve best focus. On the other hand, the focus metric curve 46 only has one minimum so it is simple to definitively determine which direction (to move the lens to move towards the best lens focus position).

FIG. 4 shows a flow diagram for an example of an embodiment of this invention that can determine a first approximate lens position with just two frames. At block 27, the decision point checks whether two frames have been captured so far, and if less than two frames have been captured, flow moves to block 29 where the lens position is moved and the processes of blocks 22-26 are repeated to obtain another focus metric value. Thus, a focus metric value is obtained for two frames (with each frame captured using a different lens position). At block 28, a first approximation lens focus position may be computed from the two captured frames. Each frame produces a data point consisting of lens position and focus metric value. Data point A (47) and data point B (48) shown in FIG. 6 are an example of two data points plotted on a graph 44 (e.g., with lens position as the x-value and focus metric as the y-value). A line equation may be obtained for a line that connects the two data points by calculating a gradient. An example of an equation 53 for calculating a gradient (e.g., slope), g, for a line that connects two data points, is given below.

$$g = \frac{A_y - B_y}{A_x - B_x} \quad (53)$$

$$\text{lens\_barrel\_position} = A_x - \frac{1}{g} * (A_y - t) \quad (54)$$

$A_x$ and $B_x$ are the x-coordinates (lens position) of data point A (47) and data point B (48) respectively. $A_y$ and $B_y$ are the y-coordinates (focus metric values) of data point A (47) and data point B (48) respectively. Because the proposed focus metric is approximately linear with regard to lens barrel position (as seen in FIG. 6), in a substantial portion of the full range of lens movement, a line equation connecting the two data points may be used as an estimate of focus metric curve 46. This line may be considered as a best fit line of the two data points. This line may be referred to as a "focus metric line".

Still referring to FIG. 4, at block 28 a first approximation focus position is computed as an intersection of the lens assembly's focus metric line with a predetermined fine search boundary line. As seen in FIG. 6, the lens position at an intersection 51 of a focus metric line drawn through data points A and B and a predetermined fine search boundary line 49, y=t, where t is a predetermined threshold value, is a good approximation of the best lens focus position. The value t is predetermined as an expected focus metric value of a target image captured using a well focused lens, based on empirical laboratory testing of several specimens of the same lens assembly specification (e.g., a fixed focal length camera lens assembly). Equation 54 given above can be used to compute the first approximation lens barrel position at the intersection 51, using the fine search boundary line 49 and two data points.

In one embodiment, more than two frames may be captured to determine a first approximation lens focus position. Using more frames and thus more data points, may lead to a line equation that better approximates the focus metric curve 46 and may result in a better final approximation of the best lens focus position. As explained in the example above in connection with equations (53), (54), best fit line algorithm may be used to obtain a line equation for the data points. Alternatively, when using more than two frames, a non-linear equation (e.g., a polynomial) may be used to approximate the focus metric curve 46.

Embodiments of the systems and processes disclosed in this document may be applied to individual ones of the raw RGB channels of a digital color image or a combination or transformation thereof (e.g., Y Cb Cr). Also, embodiments of the invention may be applied to the color interpolated or demosaiced image.

System

Figure 5:
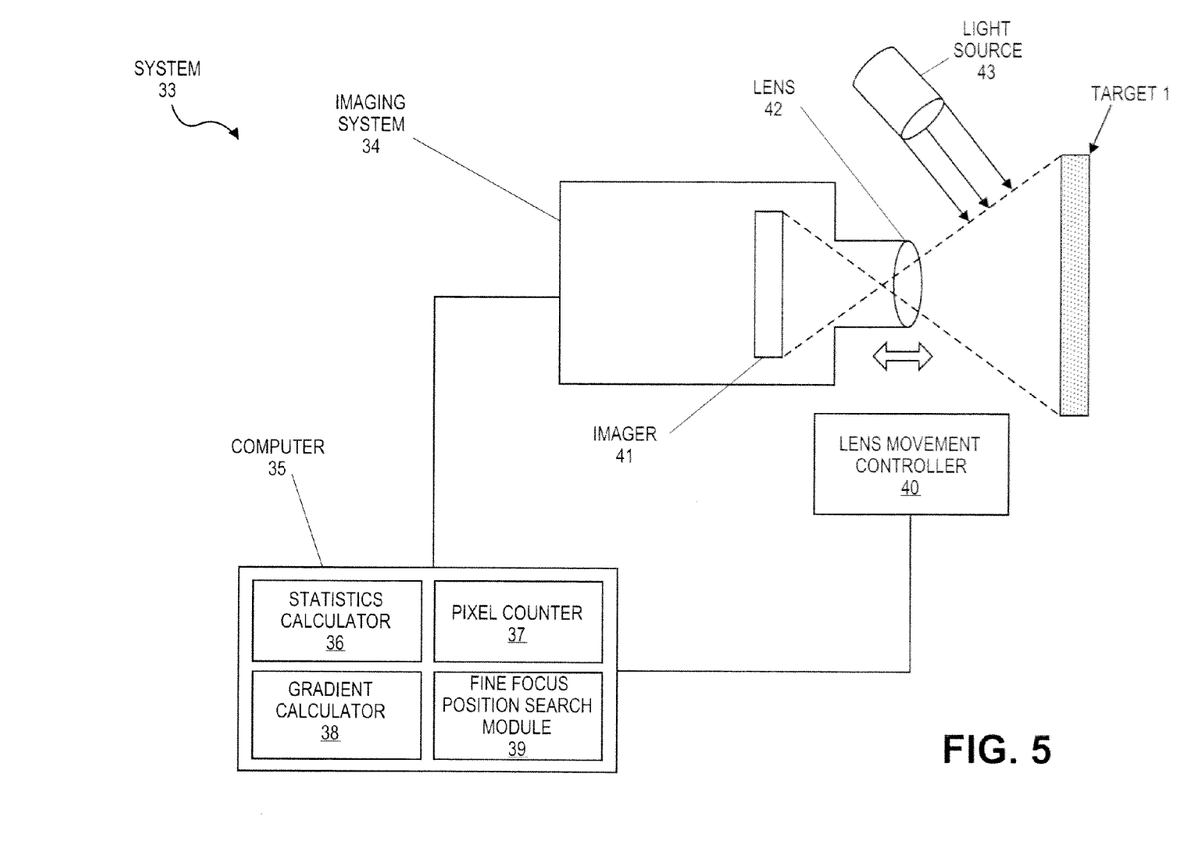
FIG. 5 is a representation of a system that can be used to determine an in-focus position of a lens.

FIG. 5 is a representation of a system 33 that can be used to determine an in-focus lens position, in accordance with embodiments of the invention. The system 33 may be part of a high volume manufacturing production test line for a lens (e.g., a digital camera lens assembly or module). The system 33 positions an imaging system 34 that is optically coupled to the lens 42 at a selected distance from a target 1, which is lit by a light source 43. In one embodiment, the lens may be held by a lens barrel and moved along an optical axis of an imager 41 using a jig that rotates the lens barrel. Imaging system 34 is operatively connected to a computer 35, using a data cable or a wireless link, so that the computer 35 can receive the digital image data of the image taken by the imaging system 34 of the target 1.

The computer 35 has a processor and memory that can store and run a test program (e.g., a computer program product) to perform the processes described above. The computer 35 may include a statistics calculator component 36 to calculate a statistical measure of a dark region and a statistical measure of a light region of a digital image captured by the imaging system 34 through the lens 42. The computer may also include a pixel counter component 37 to count the number of transition pixels in a middle region 9 of a digital image. The computer 35 may also include a gradient calculator 38 to compute a gradient for a set of data points and to obtain a first approximation lens focus position using the gradient and several data points. The computer 35 may include a fine focus position search module 39 to further find an in-focus or final lens position, starting with the lens 42 at the first approximation focus position. Additionally, the system 33 may include a lens movement controller 40 to control movement of the lens 42 along an optical axis of the imager 41, spanning the available range of lens positions. The computer 35 may coordinate and communicate with each of these components and/or modules to achieve an in-focus position for the lens 42. Several of the components and modules of the system 33 may be implemented as part of a computer 35 as depicted in FIG. 5; alternatively, they may be implemented separately in separate computers or using dedicated electronic hardware circuits.

The processes and systems described above herein may be embodied in an article of manufacture having a computer-readable medium in which instructions are stored that when executed by a programmable processor perform some of the operations described above. Some examples of computer-readable storage mediums are flash drives, USB drives, DVDs, CD-ROM disks, and hard disk drives. For instance, an embodiment of the invention can be implemented as computer software in the form of computer readable code (e.g., read from a non-volatile or tangible medium and) executed by a processor in the computer 35 to determine the best lens focus position.

Prior systems and processes for finding best lens focus position such as those that use SFR or MTF to evaluate image quality use a Fast Fourier Transform (FFT) calculation, which can be computationally intensive and hence slow, especially as the number of frames increase. Another disadvantage of the SFR technique is that the curve of SFR value with respect to lens barrel position contains several local minima and maxima, making it difficult to definitively determine the correct direction to move the lens to achieve best focus. Furthermore, the non-linear behavior of this curve makes it difficult to predict best focus position from a small number of measurements. For these reasons, previous techniques to determine best lens focus position may be too time consuming and computationally intensive. The proposed focus metric disclosed in this document uses a transition pixel counting algorithm to assess image quality so it may be less computationally intensive and therefore faster. Also, in one embodiment, the focus metric may be defined to be approximately linear with regard to lens barrel position (and descending to the best focus position) so the computation are easier, and generally monotonic on either side of the best focus position so that the direction to move the lens (towards the best focus position) can be determined by computing a gradient using as little as two frames. Thus, the systems and processes disclosed in this document may be used to obtain an in-focus lens position more quickly and efficiently. This is especially beneficial for production of very high-volume manufacture consumer electronic devices.

In some situations the system or process described in this document can be used in a manufacturing setting to set a lens to its in-focus position. The system or process may be particularly applicable to set the in-focus position for fixed focal length cameras, such as those that are installed in a desktop computer, a web cam, or a portable device including a laptop computer, a tablet computer or other consumer electronic devices. The lens position may be set using the processes described above, with the lens assembly installed into the consumer electronic device, or it may be set separately such as during a camera module sub-assembly manufacturing process (prior to installation into the consumer electronic device).

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. A method for determining an approximation of an in-focus position of a lens comprising:
   a) computing a statistical measure of a dark region of a digital image and a statistical measure of a light region of the digital image wherein the digital image is an image of an object captured by an imaging system using a lens;
   b) counting the number of transition pixels in a middle region of the digital image;
   c) using the number of transition pixels to obtain a focus metric value;
   repeating (a), (b), and (c) for an image captured at a different position of the lens to obtain another focus metric value;
   computing a gradient as a function of (i) the two focus metric values and (ii) the distance between their lens positions; and
   computing a first approximation lens focus position using the gradient.

2. The method of claim 1 wherein the transition pixels are those pixels whose values are within a range between the computed statistical measures of the light and dark regions, the method further comprising signaling that the lens be moved to the first approximation lens focus position.

3. The method of claim 2 further comprising performing a focus search process starting with the lens positioned at the first approximation lens focus position.

4. The method of claim 1 wherein the object is a target that contains a dark area, captured by the dark region being pixels of low intensity values, that is adjacent to a bright area, captured by the light region being pixels of high intensity values.

5. The method of claim 4 wherein the dark area and the bright area of the target define a slanted straight line with an abrupt transition.

6. The method of claim 4 wherein the target transitions gradually between the dark area and the bright area.

7. The method of claim 4 wherein the dark area and the bright area of the target define a curve.

8. The method of claim 1 further comprising calculating an offset parameter and using the offset parameter to define a transition pixel range, wherein the offset parameter is a function of the statistical measure of the light region of the digital image and the statistical measure of the dark region of the digital image.

9. The method of claim 8 wherein a transition pixel is a pixel that has a value higher than a sum of the statistical measure of the dark region and the offset parameter but lower than a difference between the statistical measure of the light region and the offset parameter.

10. The method of claim 1 wherein the statistical measure of the light region and the dark region remain essentially unchanged across the full range of focus positions of the lens, but that of the middle intensity region does not.

11. The method of claim 1 wherein the middle intensity region is composed of more than one enclosed area of the digital image.

12. The method of claim 1 wherein the focus metric value is normalized for the total number of pixels in the middle intensity region.

13. The method of claim 3 wherein the focus search process finds an in-focus position of the lens by determining the lens position that maximizes spatial frequency response (SFR) value.

14. The method of claim 3 wherein the focus search process finds an in-focus position of the lens by finding the lens position that minimizes the number of transition pixels.

15. A system for determining an approximation of an in-focus position of a lens comprising:
   an imaging system;
   a lens coupled to the imaging system wherein the position of the lens may be adjusted along an optical axis of the imaging system;
   a statistics calculator to obtain a statistical measure of a dark region and a statistical measure of a light region of a digital image captured by the imaging system through the lens;
   a pixel counter to count the number of transition pixels in the digital image and to obtain a focus metric value based on the number of transition pixels wherein transition pixels are pixels having a value within a selected range; and
   a gradient calculator to compute a gradient of a plurality of data points as a function of a) a plurality of focus metric values and b) their lens positions, and to obtain a first approximation lens focus position.

16. The system of claim 15 wherein the selected range for transition pixels is between the statistical measures of the dark region and the light region, the system further comprising a lens movement controller to control automatic movement of the lens along an optical axis of an imager.

17. The system of claim 15 further comprising a fine focus position search module to find the in-focus position after the lens has been moved to the first approximation lens focus position.

18. The system of claim 15 further comprising a target wherein the target contains
   a dark area adjacent to a light area and a boundary area there between, wherein the counted transition pixels represent part of the boundary area.

19. The system of claim 18 wherein the boundary between the dark area and the light area of the target includes slanted straight lines and transitions abruptly.

20. The system of claim 18 wherein the boundary between the dark area and the light area of the target transitions gradually.

21. An apparatus comprising:
   an article of manufacture having a machine-readable medium in which are stored instructions that program a computer to:
   a) obtain a statistical measure of a low intensity region of a digital image and a statistical measure of a high intensity region of the digital image wherein the digital image is an image of an object captured by an imaging system using a lens;
   b) count the number of transition pixels that are contained in a middle region of the digital image;
   c) use the counted number of transition pixels to obtain a focus metric value;
   repeat (a), (b), and (c) for an image captured at a different focus position of the lens to obtain another focus metric value;

compute a gradient as a function of (i) the two focus metric values and (ii) the distance between their lens positions;

determine a first approximation lens focus position using the gradient; and signal that the lens be moved to the first approximation lens focus position.

22. The apparatus of claim 21 wherein the instructions program a computer to define a transition pixel as a pixel whose value is within a range between the statistical measures of the high intensity and low intensity regions and perform a focus search process using the first approximation lens focus position to arrive at a final lens focus position.

23. The apparatus of claim 21 wherein the instructions program a computer to calculate an offset parameter and use the offset parameter to define a transition pixel range, wherein the offset parameter is a function of the statistical measure of the high intensity region of the digital image and the statistical measure of the low intensity region of the digital image.

24. The apparatus of claim 23 wherein a transition pixel is a pixel that has a value greater than the sum of the statistical measure of the low intensity region and the offset parameter, but smaller than the difference between the statistical measure of the high intensity region and the offset parameter.

25. The apparatus of claim 21 wherein the middle region is composed of more than one enclosed area of the digital image.

26. The apparatus of claim 21 wherein the focus metric value is normalized for the number of pixels in the middle region.

27. The apparatus of claim 22 wherein the fine focus search process uses a process that finds the lens position that maximizes spatial frequency response (SFR) value.

28. The apparatus of claim 22 wherein the fine focus search process finds the lens position that minimizes the number of transition pixels.

* * * * *